US011528232B1

(12) United States Patent
Zhang et al.

(10) Patent No.: US 11,528,232 B1
(45) Date of Patent: Dec. 13, 2022

(54) APPARATUS AND METHOD FOR HANDLING REAL-TIME TASKS WITH DIVERSE SIZE BASED ON MESSAGE QUEUE

(71) Applicant: Hong Kong Applied Science and Technology Research Institute Company Limited, Hong Kong (HK)

(72) Inventors: Xingxia Zhang, Hong Kong (HK); Ka Hung Chong, Hong Kong (HK); Qijun Zhu, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 17/458,543

(22) Filed: Aug. 27, 2021

(51) Int. Cl.
*H04L 47/629* (2022.01)
*H04L 47/628* (2022.01)
*H04L 47/6295* (2022.01)

(52) U.S. Cl.
CPC .......... *H04L 47/629* (2013.01); *H04L 47/628* (2013.01); *H04L 47/6295* (2013.01)

(58) Field of Classification Search
CPC ... H04L 47/62; H04L 47/6215; H04L 47/625; H04L 47/628; H04L 47/6295
See application file for complete search history.

(56) References Cited

U.S. PATENT DOCUMENTS

| 5,446,496 A | * | 8/1995 | Foster | G09G 5/005 |
| | | | | 348/E7.003 |
| 6,151,644 A | * | 11/2000 | Wu | H04L 49/9026 |
| | | | | 710/52 |
| 6,208,997 B1 | * | 3/2001 | Sigeti | G06T 17/20 |
| | | | | 382/124 |

(Continued)

FOREIGN PATENT DOCUMENTS

| CN | 105893497 A | 8/2016 |
| CN | 103902646 B | 4/2017 |

(Continued)

OTHER PUBLICATIONS

International Search Report and Written Opinion of corresponding PCT Patent Application No. PCT/CN2021/115869 dated Apr. 26, 2022.

(Continued)

*Primary Examiner* — Jenee Holland
(74) *Attorney, Agent, or Firm* — Idea Intellectual Limited; Margaret A. Burke; Sam T. Yip (57) ABSTRACT

An apparatus for managing data messages comprises: one or more producers generating data streams containing data messages of varying sizes that required processing; one or more consumers for processing the data messages; a multi-message queues sub-system for queuing data messages having different processing time durations; a rate limiter for discriminating data messages based on processing speed for queuing the data messages in one or the other message queue of the multi-message queues sub-system; a fair dispatcher (Continued)

for dispatching the data messages to one or more consumers according to their processing statuses to maximize the processing capacity of the apparatus; and a task splitter for splitting data messages that are deemed too large.

6 Claims, 4 Drawing Sheets

(56) References Cited

U.S. PATENT DOCUMENTS

| | | | | |
|---|---|---|---|---|
| 6,741,559 | B1* | 5/2004 | Smeulders | H04L 49/3054 |
| | | | | 370/229 |
| 7,870,310 | B2* | 1/2011 | Au | G06F 5/065 |
| | | | | 326/38 |
| 8,023,408 | B2 | 9/2011 | Herrmann | |
| 9,063,790 | B2 | 6/2015 | Liu | |
| 9,519,946 | B2* | 12/2016 | Kaburlasos | G09G 5/363 |
| 10,069,767 | B1* | 9/2018 | Swartzentruber | H04L 49/9005 |
| 10,740,002 | B1* | 8/2020 | Aden | G06F 3/0659 |
| 2004/0249571 | A1* | 12/2004 | Blesener | B61L 29/28 |
| | | | | 340/907 |
| 2005/0281279 | A1* | 12/2005 | Dennison | H04L 47/50 |
| | | | | 370/412 |
| 2006/0018177 | A1* | 1/2006 | Au | G11C 8/16 |
| | | | | 365/230.01 |
| 2006/0039370 | A1* | 2/2006 | Rosen | H04L 49/3018 |
| | | | | 370/389 |
| 2006/0247057 | A1* | 11/2006 | Green | G07F 17/323 |
| | | | | 463/42 |
| 2009/0003335 | A1* | 1/2009 | Biran | H04L 47/10 |
| | | | | 370/389 |
| 2009/0006932 | A1* | 1/2009 | Biran | G06F 13/4282 |
| | | | | 714/E11.032 |
| 2011/0208891 | A1* | 8/2011 | Meyers | G06F 13/385 |
| | | | | 710/313 |
| 2013/0016726 | A1* | 1/2013 | Numakura | G11C 8/16 |
| | | | | 370/394 |
| 2013/0021968 | A1* | 1/2013 | Reznik | H04L 45/245 |
| | | | | 370/328 |
| 2014/0132616 | A1* | 5/2014 | Han | G09G 5/399 |
| | | | | 345/547 |
| 2016/0029403 | A1* | 1/2016 | Roy | H04W 72/0406 |
| | | | | 370/336 |
| 2016/0055042 | A1* | 2/2016 | Kwong | H04L 67/1029 |
| | | | | 719/314 |
| 2016/0127462 | A1* | 5/2016 | Mu | H04L 67/1095 |
| | | | | 709/219 |
| 2017/0134330 | A1 | 5/2017 | Clark et al. | |
| 2017/0242735 | A1 | 8/2017 | Brooks et al. | |
| 2017/0272504 | A1 | 9/2017 | Cahill et al. | |
| 2019/0129771 | A1 | 5/2019 | Chen et al. | |
| 2020/0409763 | A1 | 12/2020 | Bischel et al. | |
| 2020/0413422 | A1* | 12/2020 | Jia | H04W 40/12 |
| 2021/0014177 | A1* | 1/2021 | Kasichainula | H04L 47/6295 |
| 2021/0125622 | A1* | 4/2021 | Zhao | G10L 19/167 |

FOREIGN PATENT DOCUMENTS

| | | |
|---|---|---|
| CN | 110727507 A | 1/2020 |
| CN | 111506430 A | 8/2020 |
| CN | 111737027 A | 10/2020 |

OTHER PUBLICATIONS

Sergei Arnautov et al., "FFQ: A Fast Single-Producer/Multiple-Consumer Concurrent FIFO Queue", 2017 IEEE International Parallel and Distributed Processing Symposium, Dec. 31, 2017.

* cited by examiner

APPARATUS AND METHOD FOR HANDLING REAL-TIME TASKS WITH DIVERSE SIZE BASED ON MESSAGE QUEUE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to techniques of computer data communication and task scheduling, and more specifically, to systems and methods for message queuing. Still more specifically, the present invention relates to systems and methods that process multiple data streams of different sizes using message queues.

BACKGROUND OF THE INVENTION

In recent years, social media has become an important part of the advertising industry. It has also manifested itself in many business functions from marketing and customer relationship management to risk management. With the proliferation of social media and other new forms for multi-party communication and collaboration technologies, more and more data are generated, in turn requiring more processing and analysis in order to extract useful information from them. These are only a few exemplary applications that are having increasingly high demands on computing resources. Others including cryptographic applications, surveillance, machine learning/artificial intelligence (AI) applications, robots and autonomous devices, etc. are also creating tremendous amount of data and demands on computer processing power.

Figure 1:
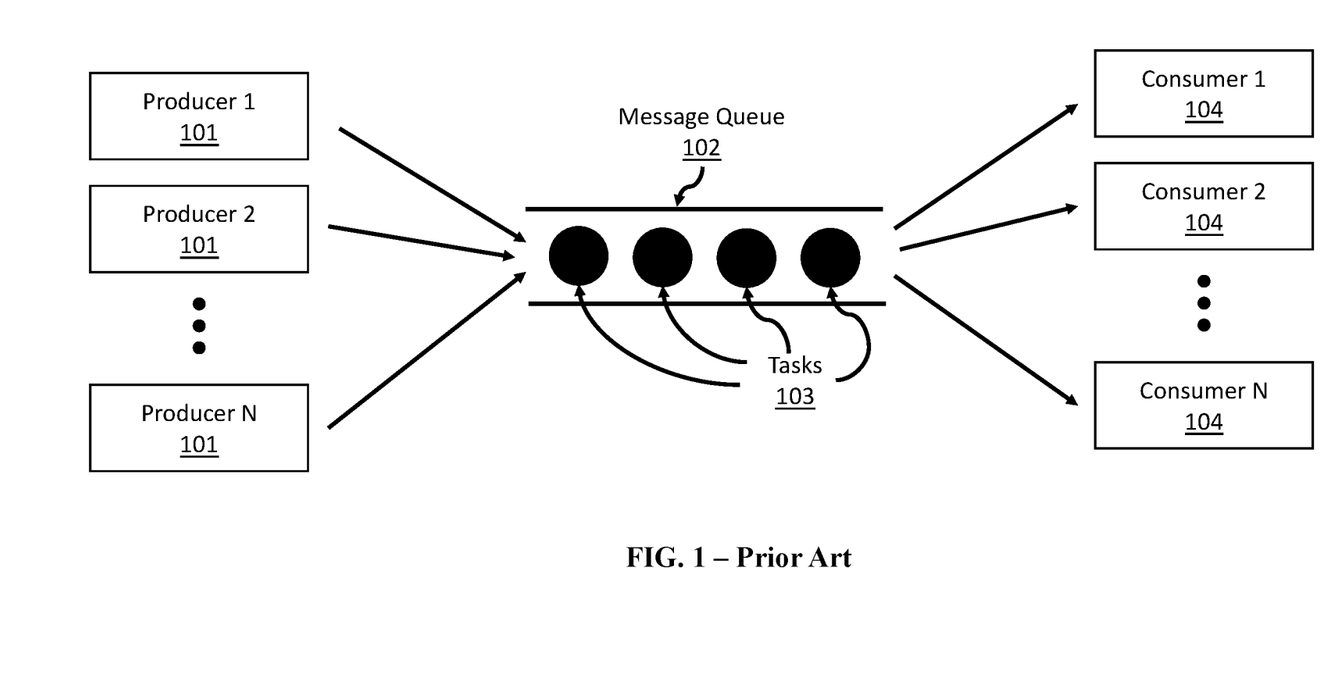
FIG. 1 depicts a logical structural block diagram of an exemplary computing platform employing a message queue.

Referring to FIG. 1 for illustrating an exemplary data analytics platform of today. In this platform, multiple data streams of social media data with different sizes of tasks are handled by a data processing system comprising: one or more producer devices (101) for creating data messages and delivering them to a message queue; a message queue (102) for receiving data messages (103) from the producer devices and dispatching the data messages to one or more consumer devices; and one or more consumer devices (104) connected to the message queue for consuming and processing the data messages as tasks.

In many applications (e.g., multi-transactional online applications, big data analysis, crypto verifications, data file downloads, etc.), a message queue is used to act as a middleman for various services to delegate tasks to multiple consumers for load balancing, fault tolerance, and/or parallel processing.

Traditionally, under such system that employs a message queue, a user or task owner often waits for long periods of time even for a small task submitted when there are already some large tasks in the queue ahead of the small task. It is difficult to respond fairly because different data streams may join the data analytics platform dynamically and the data sizes are unpredictable until they are processed. In certain extreme situation, when a huge task begins to be processed, the task itself takes too much time and causes timeout error. It is also difficult to guarantee timely processing for a large number of data streams. Therefore, there is an unmet need for a technique for managing and processing data messages and tasks using a message queue fairly and timely.

SUMMARY OF THE INVENTION

The present invention provides an apparatus and a method for managing and processing data messages employing multiple messaging queues and having a fair message dispatching mechanism, controllable message processing speed or rate using the multiple messaging queues, and a message splitting function that address the prior arts' shortcomings in timeliness and fairness in using message queue.

In accordance to one aspect of the present invention, an apparatus for managing data messages (or tasks) is provided. The apparatus comprises: one or more producers generating data messages (or tasks) of varying sizes that require processing; one or more consumers for processing the data messages (or tasks); a multi-message queues sub-system for queuing data messages (or tasks) having different processing time durations; a rate limiter for discriminating data messages (or tasks) based on processing speed for queuing the data messages (or tasks) in one or the other message queue of the multi-message queues sub-system; a fair dispatcher for dispatching the data messages (or tasks) to one or more consumers according to their processing statuses to maximize the processing capacity of the apparatus; and a task splitter for splitting data messages (or tasks) that are deemed too large. Each of the data messages (or tasks) is associated with a task owner, which can be a human user, a logical entity such as an organization, or a physical or logical computing device. It is possible for multiple producers to generate data messages (or tasks) that are associated with the same task owner.

In accordance to one embodiment, each of the consumers incorporates the rate limiter, the task splitter, and a set of condition logic instructions for interacting with the rate limiter and task splitter; wherein the interactions include receiving output from the rate limiter, directing data messages (or tasks) to processing, requeuing, or splitting, and triggering the task splitter to split a data message (or task) that is deemed too large into smaller sub-data messages (or sub-tasks).

The multi-message queues sub-system comprises at least a main message queue; and a slow message queue. The main message queue is configured to queue all data messages (or tasks) initially received from the producers. The slow message queue is configured to queue data messages (or tasks) that are deemed too large (as larger than certain size thresholds) and are split, or having processing rates exceeding certain processing rate limits.

The task splitter, which is incorporated in each consumer in accordance to one embodiment, is configured to split a data message (or task) that is deemed too large into smaller sub-data messages (or sub-tasks). The smaller sub-data messages (or sub-tasks) are then requeued in the slow message queue.

The rate limiter, which is incorporated in each consumer in accordance to one embodiment, is configured to limit the respective consumer's processing of the data messages (or tasks) associated with the same task owner by the number or by processing time. This is so to avoid a consumer being excessively occupied by too numerous smaller sub-data messages (or sub-tasks) split from a data message (or task) that is deemed too large, or too numerous data messages (or tasks) associated with the same task owner for the consumer to process, in turn blocking other data messages (or tasks) associated with other task owners waiting in the message queue. The rate limiter is further configured to rate the respective consumer's processing of data messages (or tasks) by continuously evaluating whether the number of data messages (or tasks) associated with any one particular task owner being processed is larger than a maximum number within a time window. If it is larger, then further data messages (or tasks) are directed to be requeued in the slow message queue.

The fair dispatcher is configured to dispatch the data messages (or tasks) to one or more consumers according to their processing statuses to maximize the total processing capacity of all the consumers.

BRIEF DESCRIPTION OF THE DRAWINGS

Embodiments of the invention are described in more detail hereinafter with reference to the drawings, in which.

DETAILED DESCRIPTION

In the following description, apparatuses and methods for managing data messages in a messaging queue and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 2:
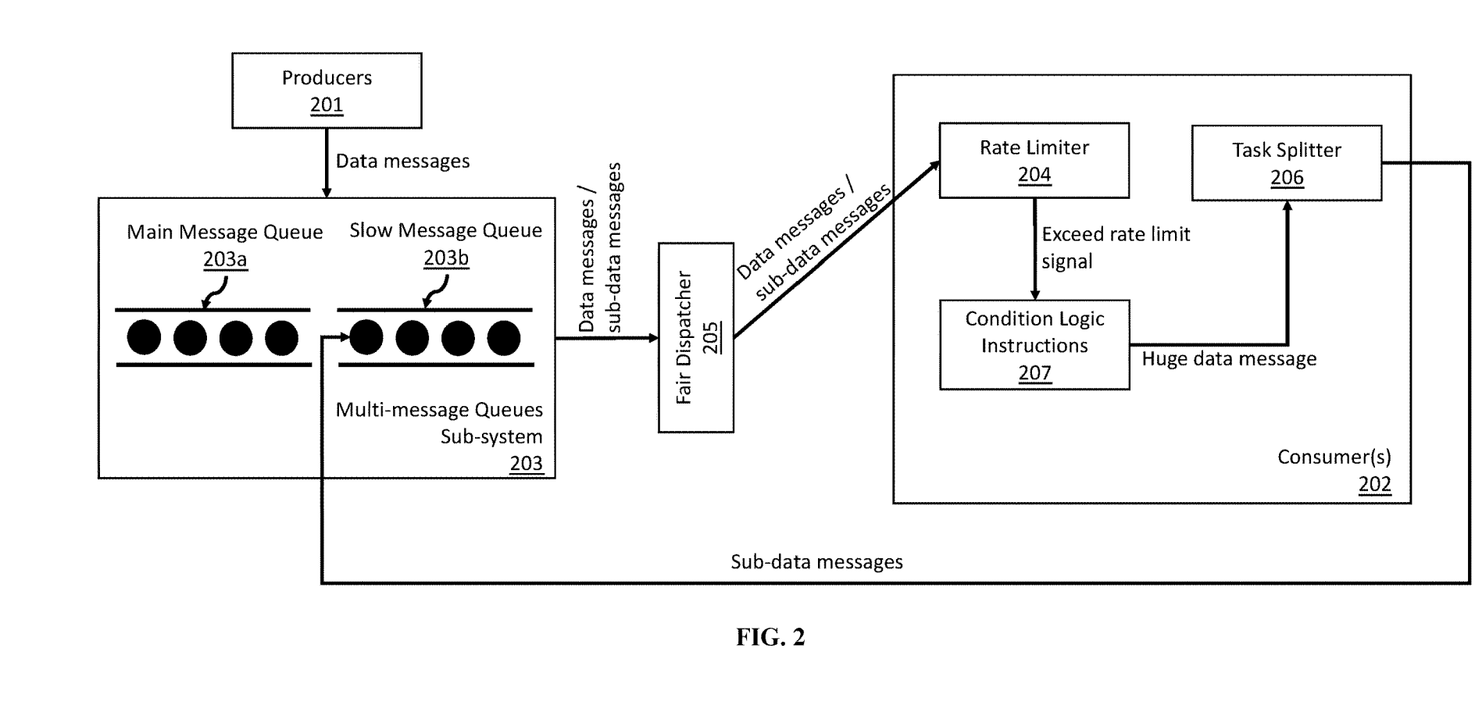
FIG. 2 depicts a logical structural block diagram of an apparatus for managing data messages in accordance to various embodiments of the present invention.

Referring to FIG. 2. In accordance to one aspect of the present invention, an apparatus for managing data messages (or tasks) is provided. The apparatus comprises: one or more producers (201) generating data messages (or tasks) of varying sizes that require processing; one or more consumers (202) for processing the data messages (or tasks); a multi-message queues sub-system (203) for queuing data messages (or tasks) having different processing time durations; a rate limiter (204) for discriminating data messages (or tasks) based on processing speed for queuing the data messages (or tasks) in one or the other message queue of the multi-message queues sub-system; a fair dispatcher (205) for dispatching the data messages (or tasks) to one or more consumers according to their processing statuses to maximize the processing capacity of the apparatus; and a task splitter (206) for splitting data messages (or tasks) that are deemed too large.

In accordance to various embodiments, a producer (201) is a logical processing unit which may be a virtual computing device, or a physical computing device having at least a specially configured computer processor, such as, without limitation, a personal computer, a smartphone, an electronic kiosk, and other electronic user interface device, configured to interact with a human user and generate data retrieval and storage requests, and computing service requests. The producer (201) may also be an autonomous computing device, such as, without limitation, a drone, self-driving vehicle, smart appliances, and other computer system or component, configured to generate data retrieval and storage requests, and computing resources requests.

In accordance to various embodiments, a consumer (202) is a logical processing unit, which may be one or more virtual computing servers, or one or more physical server computing devices each having at least a specially configured computer processor, such as, without limitation, one or more interconnected server computers, a cluster of server computers, and one or more distributed computing devices, configured to process and respond to data retrieval and storage requests, and computing service requests.

In accordance to various embodiments, each of the multi-message queues sub-system (203), the rate limiter (204), the fair dispatcher (205), and the task splitter (206) is a logical processing unit that can be implemented by computer instructions that are executable by one or more physical and/or virtual computing devices or one or more specially configured processors.

In accordance to one embodiment, each of the consumers (202) incorporates or connects to its dedicated rate limiter (204), its dedicated task splitter (206), and a set of condition logic instructions (207) for being executed or for configuring the consumer (202) to interact with the rate limiter (204) and task splitter (206); wherein the interactions include receiving output from the rate limiter (204), directing data messages (or tasks) to processing, requeuing, or splitting based on properties of the data messages (or tasks) in comparison to certain thresholds, and triggering the task splitter to split a data message (or task) that is deemed too large into smaller data messages (or tasks) based on certain thresholds.

The multi-message queues sub-system (203) comprises at least a main message queue (203a); and a slow message queue (203b). The main message queue (203a) is configured to queue all data messages (or tasks) initially received from producer devices. The slow message queue (203b) is configured to queue data messages (or tasks) that are deemed too large (as exceeding certain size thresholds) and are split, or having processing time exceeding certain processing time thresholds. In one embodiment, the multi-message queues sub-system (203) comprises the main message queue (203a) and a single slow message queue (203b). In this case, the condition logic instructions (207) contain only one size threshold for data messages (or tasks) that are exceeding the size threshold to be split and directed to be requeued in the single slow message queue (203b), and only one processing rate limit over which the corresponding data messages (or tasks) are directed to be requeued in the single slow message queue (203b). In other embodiments, the multi-message queues sub-system (203) comprises the main message queue (203a) and a plurality of slow message queues (203b). In this case, the condition logic instructions (207) contain one or more size thresholds, each corresponding to one of the slow message queues (203b), for data messages (or tasks) that are exceeding the size thresholds to be split and directed to be requeued in the respective slow message queues (203b) according to which size thresholds that they are exceeding, and one or more processing rate limits over which the corresponding data messages (or tasks) are directed to be requeued in the respective slow message queues (203b) according to which rate limits that they are exceeding.

Each of the consumers (202) is subscribed to one or more of the message queues of the multi-message queues sub-system (203) according to a pre-defined configuration. The fair dispatcher (205) is configured to dispatch queued data messages (or tasks) from the message queues to the consumers (202) based on the consumer subscription of each of the message queues.

The task splitter (206), which is incorporated in or connected to each consumer (202) in accordance to one embodiment, is configured to split a data message (or task) that exceeds the configurable predefined size threshold into a configurable predefined number of the sub-data messages (or sub-tasks), if splitting of the data message (or task) is feasible. The post-split sub-data messages (or sub-tasks) are then requeued in the slow message queue(s) (203b). If a data message (or task) or sub-data message (or sub-task) cannot be split and that it exceeds a configurable predefined size upper limit, the data message (or task) or sub-data message (or sub-task) is marked failed and removed from the multi-message queues sub-system (203) for special handling.

The rate limiter (204), which is incorporated in or connected to each consumer (202) in accordance to one embodiment, is configured to limit the respective consumer's processing of the data messages (or tasks) associated with one task owner by the number or by processing time. This is so to avoid a consumer being excessively occupied by too numerous small sub-data messages (or sub-tasks) split from a data message (or task) that is deemed too large, or too numerous data messages (or tasks) associated with the same task owner for the consumer to process, in turn blocking other data messages (or tasks) associated with other task owners waiting in the main message queue.

The rate limiter (204) is further configured to rate the respective consumer's processing of data messages (or tasks) by continuously evaluating whether a rate limit for processing data messages (or tasks) associated with any one particular task owner is reached. If the rate limit is reached for a particular task owner, then further data messages (or tasks) associated with that task owner are directed to be requeued the slow message queue without being processed.

Figure 3:
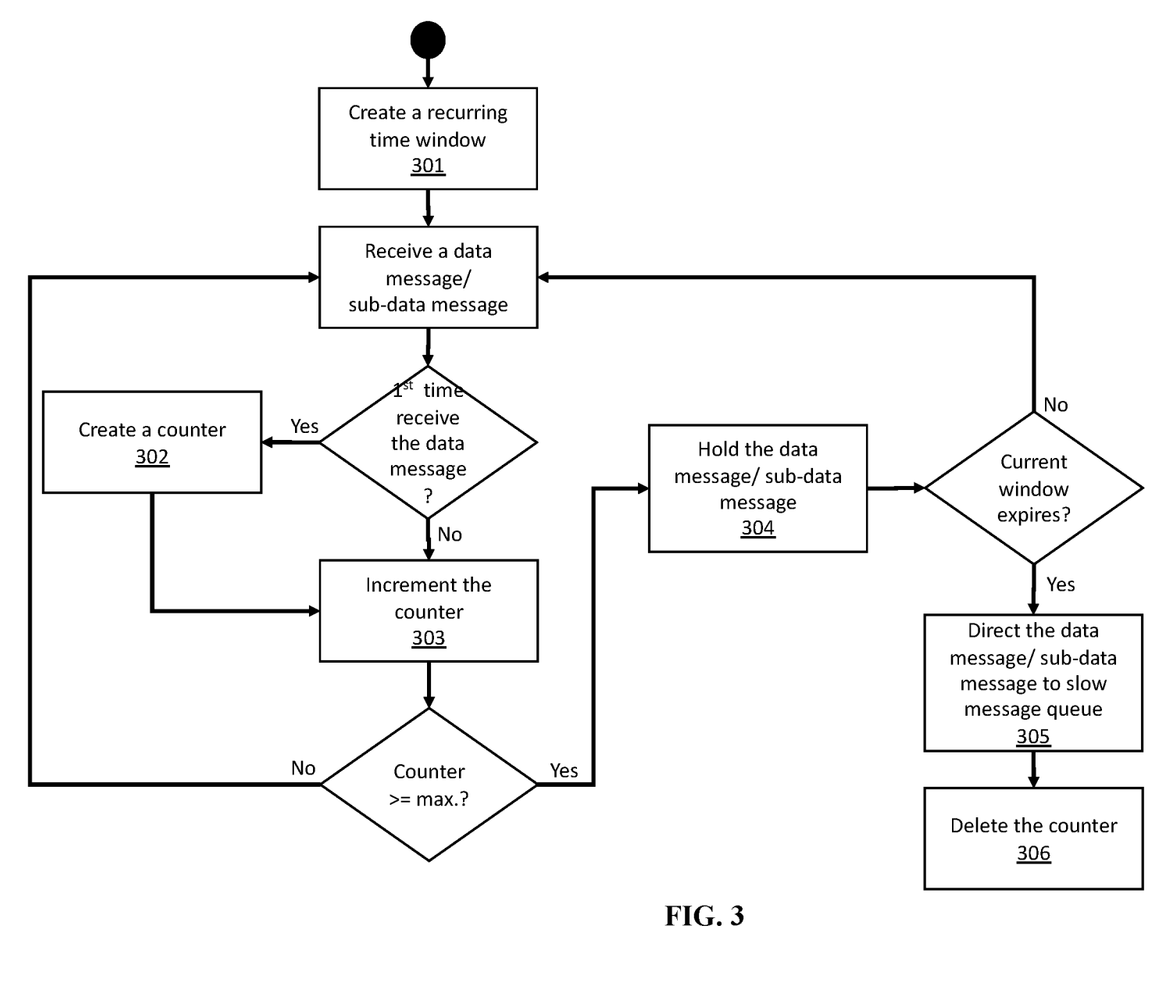
FIG. 3 depicts a flowchart of a method of evaluating rate limit in the handling of data messages in accordance to one embodiment of the present invention.

Referring to FIG. 3. In accordance to one embodiment, the rate limit evaluation of the rate limiter (204) comprises: (301) creating a recuring time window of a configurable predefined duration; and (302) creating a counter and (303) incrementing the counter by one for each data message (or task) associated with a particular task owner that is first received by its respective consumer (202). The data message (or task) is identified by the rate limiter (204) by its identification $Task_{id=i}$ (e.g., "Task-XXX"). If the data message (or task) is split into sub-data messages (or sub-tasks), and the sub-data messages (or sub-tasks) (identifiable by the same identification, $Task_{id=i}$, of the parent data message (or task) they are split from) are subsequently directed back to the consumer (202) for processing after requeuing, the counter is incremented for the receipt of each of the sub-data message (or sub-task) as well. If the counter equals or exceeds the configurable predefined maximum number, the data message (or task) or any sub-data message (or sub-tasks) identifiable by the same identification, $Task_{id=i}$ is (304) held without from the processing consumer, allowing the consumer (202) to continue processing other data message or sub-data message, and (305) is directed to be requeued in the slow message queue (203b) when the current time window expires. When the current time window expires, (306) the counter for the data message (or task) and sub-data messages (or sub-tasks) identified by $Task_{id=i}$ created by the rate limiter (204) is deleted.

The fair dispatcher (205) is configured to dispatch the data messages (or tasks) and sub-data messages (or sub-tasks) from the message queues to one or more consumers (202) based on the consumer subscription of each of the message queues and according to the processing statuses of the consumers (202) to maximize the total processing capacity of all the consumers (202). In accordance to one embodiment, the fair dispatcher (205) detects the availability status of each of the consumers (202). When a consumer (202) is processing one data message (or task), its availability status is marked BLOCKED. In this case, the fair dispatcher stopped dispatching further data messages (or tasks) or sub-data messages (or sub-tasks) to this consumer (202) until its processing is completed, and its availability status is marked AVAILABLE. In this case, the fair dispatcher (205) continues to dispatch the next data message (or task) from one of the main message queue (203a) and slow message queue (203b) to this AVAILABLE consumer (202) based on the consumer subscription of each of the message queues.

Figure 4:
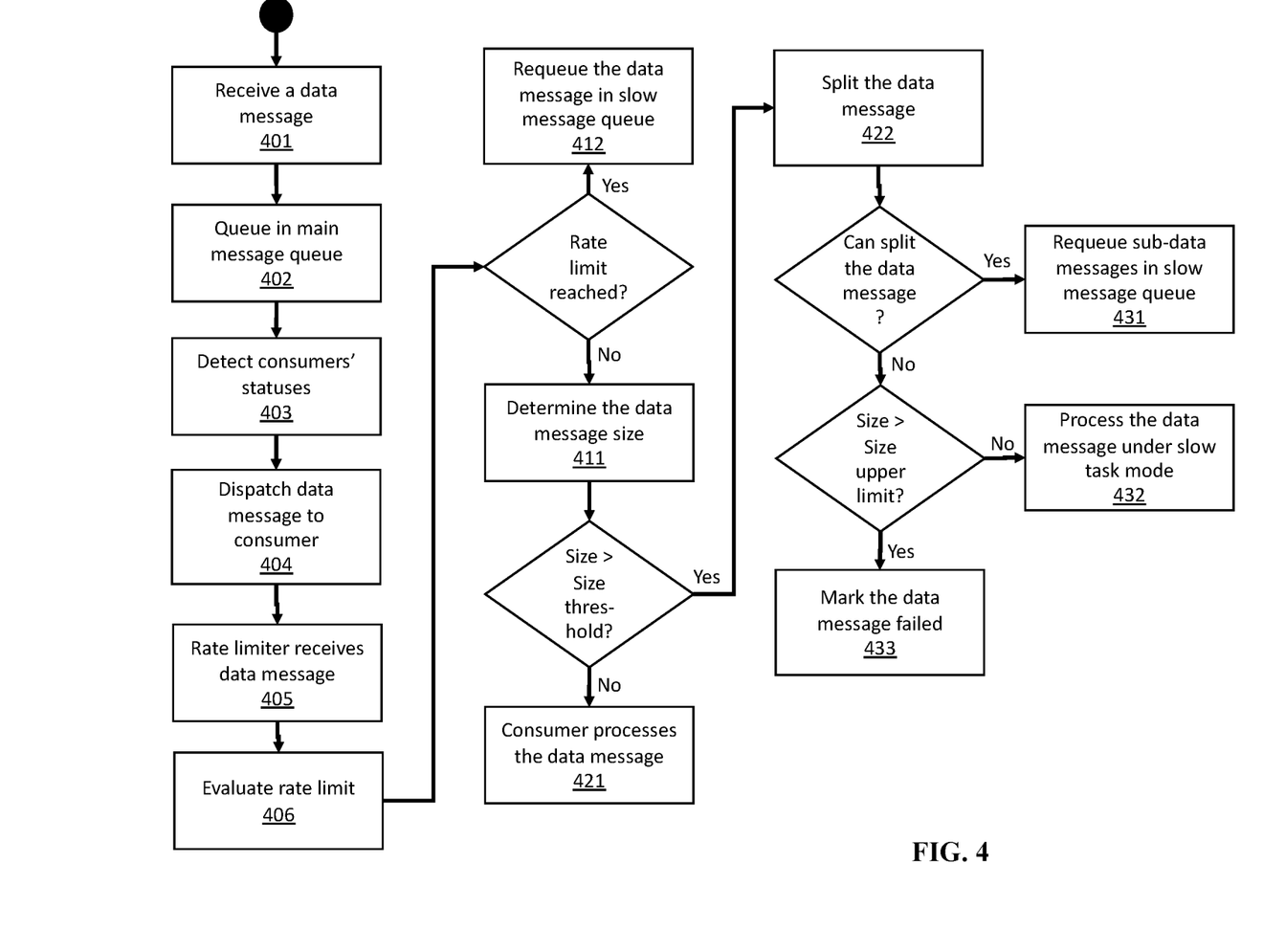
FIG. 4 depicts a flowchart of a method for managing data messages in accordance to various embodiments of the present invention.

Referring to FIG. 4. In accordance to another aspect of the present invention, a method executed by the apparatus for managing data messages (or tasks) is provided. The method comprises: (401) receiving, by the multi-message queues sub-system (203), a data message (or task) from a producer; (402) queuing initially the data message (or task), by the multi-message queues sub-system (203), in the main message queue (203a); (403) detecting, by the multi-message queues sub-system (203), the availability status of each of the consumers (202), wherein a processing consumer is selected based on its availability to receive a data message (or task) for processing; (404) dispatching, by the multi-message queues sub-system (203), a data message (or task) positioned at head of queue from one of the main message queue (203a) and slow message queue (203b) to the processing consumer; (405) receiving, by the rate limiter (204), the data message (or task) to be processed; (406) evaluating, by the rate limiter (204), its rate limits on whether its rate limit for the data message (or task) to be processed is reached; (411) if the rate limit is not yet reached, determining, by the set of condition logic instructions (207), the size of the data message (or task) to be processed; (421) if the size does not exceed the size threshold, directing, by the set of condition logic instructions (207), the data message (or task) to be processed by the processing consumer; (422) else if the size exceeds the size threshold, directing, by the set of condition logic instructions (207), the data message (or task) to be processed to the task splitter (206); (431) if the data message (or task) to be processed can be split, it is split, by the task splitter (206), into a plurality of sub-data messages (or sub-tasks) and are directed, by the set of condition logic instructions (207), to be requeued in the slow message queue (203b) without being processed; (432) else if the data message (or task) to be processed cannot be split, and if the size of the data message (or task) to be processed does not exceed a size upper limit, directing, by the set of condition logic instructions (207), the data message (or task) to be processed by the processing consumer under a slow task mode; (433) else if the size of the data message (or task) to be processed exceeds the size upper limit, the data message (or task) to be processed is marked failed and removed from the multi-message queues sub-system (203) for special handling; (412) if the rate limit is reached, directing, by the set of condition logic instructions (207), the data message (or task) to be processed to be requeued in the slow message queue (203b) without being processed.

All or portions of the embodiments disclosed herein may be implemented using one or more of specially configured computing devices, computer processors, or electronic circuitries including but not limited to graphics processing units (GPUs), application specific integrated circuits (ASICs), field programmable gate arrays (FPGAs), and other programmable logic devices configured or programmed according to the teachings of the present disclosure. Computer instructions or codes running in the computing devices, computer processors, or programmable logic devices can readily be prepared by practitioners skilled in the software or electronic art based on the teachings of the present disclosure. The aforesaid one or more computing devices may include one or more of server computers, personal computers, laptop computers, mobile computing devices such as smartphones and tablet computers.

The electronic embodiments include computer-readable storage media having the computer instructions or codes stored therein, which can be used to configure or program the computing devices, computer processors, or electronic circuitries to perform any of the processes of the present invention; and to store data generated by any of the processes of the present invention. The computer-readable storage media include, but are not limited to, floppy disks, optical discs, Blu-ray Disc, DVD, CD-ROMs, magneto-optical disks, solid-state discs, ROMs, RAMs, SRAMs, DRAMs, flash memory devices, electrically programmable read-only memories (EPROMs), electrically erasable programmable read-only memories (EEPROMs), or any type of media or devices suitable for storing instructions, codes, and/or data.

Various embodiments of the present invention also may be implemented in distributed computing environments and/or Cloud computing environments, wherein the whole or portions of computer instructions or codes are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for managing and processing data messages with messaging queues comprises:
    receiving, by a multi-message queues sub-system, a data message associated with a task owner from a producer;
    queuing initially the data message, by the multi-message queues sub-system, in a main message queue;
    detecting, by the multi-message queues sub-system, an availability status of each of a plurality of consumers, wherein a consumer is selected to be a processing consumer based on consumer's availability to receive a data message for processing;
    dispatching, by the multi-message queues sub-system, a data message to be processed, wherein the data message to be processed is positioned at head of queue of the main message queue or a slow message queue to the processing consumer;
    receiving, by a rate limiter, the data message to be processed;
    evaluating, by the rate limiter, whether a rate limit for the data message to be processed is reached;
    if the rate limit is not yet reached, determining a size of the data message to be processed;
        if the size does not exceed a configurable predefined size threshold, directing the data message to be processed by the processing consumer;
        else if the size exceeds the predefined size threshold, directing the data message to be processed to a task splitter;
            if the data message to be processed can be split, splitting, by the task splitter, the data message to be processed into a plurality of sub-data messages, and requeuing the sub-data messages in a slow message queue;
            else if the data message to be processed cannot be split and if the size of the data message to be processed does not exceed a size upper limit, processing, by the processing consumer, the data message to be processed under a slow task mode;
            else if the data message to be processed cannot be split and if the size of the data message to be processed exceeds the size upper limit, removing the data message to be processed from the multi-message queues sub-system for special handling;
    if the rate limit is reached, requeuing the data message to be processed in a slow message queue.

2. The method of claim 1, wherein the evaluation of whether a rate limit for the data message to be processed is reached comprising:
    creating a recurring time window of a configurable predefined duration;
    creating a counter for each data message associated with a task owner that is first received by the rate limiter;
    incrementing the counter by one for each time a data message or any sub-data message associated with the task owner is subsequently received by the rate limiter;
    if the counter equals or exceeds a configurable predefined maximum number, then:
    the data message or the sub-data message associated with the task owner that is received by the rate limiter is held from the processing consumer, allowing the processing consumer to continue processing other data message or sub-data message; and
    the data message or the sub-data message associated with the task owner that is received by the rate limiter is directed to be requeued in the slow message queue when a current time window expires; and
    when a current time window expires, the counter is deleted.

3. The method of claim 1, wherein the multi-message queues sub-system further comprises a plurality of slow message queues;
    wherein each of the slow message queues is corresponding to one of a plurality of predefined size thresholds such that data messages that exceed the predefined size threshold are to be split and requeued in the respective slow message queues; and
    wherein each of the slow message queues is corresponding to one of a plurality of rate limits over which data messages are to be requeued in the respective slow message queues.

4. An apparatus for managing and processing data messages with messaging queues comprises:
    a multi-message queues sub-system comprising a main message queue and a slow queue, the multi-message queues sub-system is configured to:

receive a data message from a producer;
queue initially the data message in the main message queue;
detect an availability status of each of a plurality of consumers, wherein a consumer is selected to be a processing consumer based on consumer's availability to receive a data message for processing; and
dispatch a data message to be processed, wherein the data message to be processed is positioned at head of queue of the main message queue or a slow message queue to the processing consumer;

a task splitter configured to:
split a data message to be processed which is having a size exceeding a configurable predefined size threshold into a plurality of sub-data messages;

a rate limiter associated with the processing consumer, the rate limiter is configured to:
receive the data message to be processed;
evaluate whether a rate limit for the data message to be processed is reached;

a set of condition logic configured to:
determine a size of the data message to be processed if the rate limit is not yet reached;
direct the data message to be processed by the processing consumer if the size does not exceed the predefined size threshold; and
direct the data message to be processed to a task splitter if the size exceeds the predefined size threshold;
direct sub-data messages to be requeued in a slow message queue if the size exceeds the predefined size threshold and the data message to be processed can be split;
direct the data message to be processed to the processing consumer under a slow task mode if the size exceeds the predefined size threshold but does not exceed a size upper limit, and the data message to be processed cannot be split;
remove the data message to be processed from the multi-message queues sub-system for special handling if the size exceeds size upper limit, and the data message to be processed cannot be split; and
direct the data message to be processed to be requeued in a slow message queue when the rate limit is reached.

5. The apparatus of claim 4, wherein the evaluation of whether a rate limit for the data message to be processed is reached comprising:
creating a recuring time window of a configurable predefined duration;
creating a counter for each data message associated with a task owner that is first received by the rate limiter;
incrementing the counter by one for each time a data message or any sub-data messages associated with the task owner is subsequently received by the rate limiter;
if the counter equals or exceeds a configurable predefined maximum number, then:
the data message or the sub-data message associated with the task owner that is received by the rate limiter is held from the processing consumer, allowing the processing consumer to continue processing other data message or sub-data message; and
the data message or the sub-data message associated with the task owner that is received by the rate limiter is directed to be requeued in the slow message queue when a current time window expires; and
when a current time window expires, the counter is deleted.

6. The apparatus of claim 4, wherein the multi-message queues sub-system further comprises a plurality of message queues;
wherein each of the slow message queues is corresponding to one of a plurality of predefined size thresholds such that data messages that exceed the predefined size threshold are to be split and requeued in the respective slow message queues; and
wherein each of the slow message queues is corresponding to one of a plurality of rate limits, over which in the processing of data messages, data messages are to be requeued in the respective slow message queues.

* * * * *